United States Patent
Brothwell

(10) Patent No.: US 10,845,015 B2
(45) Date of Patent: Nov. 24, 2020

(54) LIGHT FITTING BRACKET

(71) Applicant: Mark Brothwell, Belfast (GB)

(72) Inventor: Mark Brothwell, Belfast (GB)

( * ) Notice: Subject to any disclaimer, the term of this patent is extended or adjusted under 35 U.S.C. 154(b) by 0 days.

(21) Appl. No.: 16/314,633

(22) PCT Filed: Jun. 30, 2017

(86) PCT No.: PCT/EP2017/066372
§ 371 (c)(1),
(2) Date: Dec. 31, 2018

(87) PCT Pub. No.: WO2018/002356
PCT Pub. Date: Jan. 4, 2018

(65) Prior Publication Data
US 2019/0145590 A1 May 16, 2019

(30) Foreign Application Priority Data

Jun. 30, 2016 (GB) .................................. 1611450.6

(51) Int. Cl.
| | |
|---|---|
| *F21S 8/00* | (2006.01) |
| *F21V 27/02* | (2006.01) |
| *F21V 23/00* | (2015.01) |
| *F21S 8/04* | (2006.01) |
| *F21V 21/03* | (2006.01) |
| *H02G 3/20* | (2006.01) |
| *H02G 3/10* | (2006.01) |

(52) U.S. Cl.
CPC .................. *F21S 8/03* (2013.01); *F21S 8/043* (2013.01); *F21V 21/03* (2013.01); *F21V 23/001* (2013.01); *F21V 27/02* (2013.01); *H02G 3/20* (2013.01); *F21S 8/04* (2013.01); *H02G 3/10* (2013.01)

(58) Field of Classification Search
CPC ..... F21S 8/03; F21S 8/043; F21S 8/04; F21V 27/02; F21V 21/03; F21V 23/001; H02G 3/20; H02G 3/10
See application file for complete search history.

(56) References Cited

U.S. PATENT DOCUMENTS

| | | | |
|---|---|---|---|
| 4,199,803 A | 4/1980 | Hunt, III | |
| 4,303,968 A | 12/1981 | Goralnik | |
| (Continued) | | | |

FOREIGN PATENT DOCUMENTS

| | | |
|---|---|---|
| JP | 2010140798 | 6/2010 |
| KR | 20090012509 | 2/2009 |
| (Continued) | | |

OTHER PUBLICATIONS

International Search Report dated Sep. 7, 2017.
(Continued)

*Primary Examiner* — Tracie Y Green
(74) *Attorney, Agent, or Firm* — Preston Smirman; Smirman IP Law, PLLC

(57) ABSTRACT

A bracket 1 for attaching a light fitting to a ceiling or wall. The bracket 1 has a main body 2 to be directly applied to the ceiling or wall and to be flush with the ceiling or wall. The main body 2 has a central portion 3 with a central aperture 4 for the passage of the electrical cable 12 coming out from the ceiling or wall. The central aperture 4 being sized so that the electrical cable 12 can easily pass through it.

24 Claims, 5 Drawing Sheets

(56) References Cited

U.S. PATENT DOCUMENTS

| | | | |
|---|---|---|---|
| 6,207,897 B1 * | 3/2001 | Reiker | E04B 9/006 |
| | | | 174/58 |
| 6,653,558 B1 * | 11/2003 | Bucher | F21V 21/03 |
| | | | 174/50 |
| 2004/0042222 A1 | 3/2004 | Childs | |
| 2004/0095752 A1 | 5/2004 | Hsu | |
| 2004/0218396 A1 | 11/2004 | Garber et al. | |
| 2015/0008473 A1 * | 1/2015 | Lee | H01L 33/642 |
| | | | 257/99 |
| 2016/0131346 A1 | 5/2016 | Creasman et al. | |
| 2018/0328573 A1 * | 11/2018 | Behnke | F21S 8/03 |

FOREIGN PATENT DOCUMENTS

| | | |
|---|---|---|
| NL | 1025015 | 6/2005 |
| WO | 2007023211 | 3/2007 |

OTHER PUBLICATIONS

Written Opinion of the International Searching Authority dated Sep. 7, 2017.
International Preliminary Report on Patentability dated Jan. 1, 2019.
English Abstract of KR 20090012509.
English Abstract of NL 1025015.
English Abstract of JP 2010140798.

* cited by examiner

LIGHT FITTING BRACKET

CROSS-REFERENCE TO RELATED APPLICATION

The instant application is a national phase of PCT International Application No. PCT/EP2017/066372 filed Jun. 30, 2017, and claims priority to GB Patent Application Serial No. 1611450.6 filed Jun. 30, 2016, the entire specifications of both of which are expressly incorporated herein by reference.

The present invention relates to a light fitting bracket and in particular to an improved light fitting bracket for attaching a light fitting to a ceiling and/or wall.

Conventionally during the replacement of one light fitting bracket for another, upon removing an existing light fitting bracket a light fitting installer will be confronted with three ceiling apertures; a larger central aperture whereby the electrical cable passes through and two fastener apertures along either side of the central aperture for receiving screws or the like. The conventional strap bracket light fitting is widely known in relation to light fittings and fixtures. The "strap" bracket is required to extend parallel to the central aperture in the ceiling. This presents an installer with at least two problems.

The first of these problems is that in many cases the strap bracket due to the positioning of the fastening apertures will extend over the central aperture of the ceiling. This results in that the installer must bend this electrical cable around the conventional strap bracket. The weight of the cable pushing down on the bar during installation of the new bracket to the ceiling makes installing light fittings and fixtures cumbersome and time-consuming. This is due to an installer necessarily being required to push and hold the electrical cable out of the way of the bar while aligning the conventional strap bracket to the fastening apertures in the ceiling with one hand and fasten the fasteners with their other hand.

The second problem is that if the conventional strap bracket extends parallel to the central ceiling aperture but not over the central aperture (as described above) the entire light fitting is off-center with respect to the position of the original light fitting which would have been measured to be centrally mounted. Furthermore, light fittings are often uniformly distributed, with respect to other light fittings which may be present in the ceiling and so any significant deviation from the original location effects the symmetry.

Further issues arise whereby the fastener apertures in the ceiling do not align to the apertures within the conventional strap bracket. Upon aligning the conventional bracket to the first fastening aperture of the ceiling the second fastener aperture may not align. If this occurs an installer is faced with the dilemma of either drilling a fresh aligned aperture within the ceiling or by fastening the conventional light fitting bracket with a single fastener. The installer will often take this first option due to the difficulty associated with locating and drilling a second aperture, usually involving step down from a ladder or raised platform to get the required tools and setting the bracket and light fitting down. Alternatively, the light fitting electric components of the light fitting may be left connected to the main electrical cable of the property with the light fitting dangling by the relevant electric cables unsupported; causing damage to the property's electrical components and/or the light fitting's electrical components. In this case, the drilling of a new aperture may be unsightly. On the other hand, by only utilising a single fastener to attach the light fitting stress concentrations upon that single fastener due to the weight of the light fitting as well as forces applied by the electrical cables can cause damage the ceiling plasterboard and result in the light fitting pulling away from the ceiling. Further, by utilising only one fastener the light fitting would not be flush to the ceiling as the light fitting would sit at an angle with one portion of the light fitting base being a short distance from the ceiling. This results in an unsightly finish to the newly installed light fitting.

A further problem with light fitting brackets of the prior art centres around the number of cables which must pass from the ceiling into the light fitting. It is often the case that there are four live, earth and neutral wires as well as a feed wire passing through the ceiling and into the light fitting or electrical distribution box. In many cases the bracket is mounted within the light fitting where a ceiling mounted part of the light fitting is flush with the ceiling and the bracket is mounted within the light fitting or electrical distribution box. The bracket has a central portion cranked out of the main plane of the bracket so as not to be flush with the ceiling. This allows all of the electrical wires to pass through a large hole in the ceiling mounted part and into the space created by the cranked part of the bracket into various electrical connectors. The disadvantage of this light fitting is that it requires a ceiling mounted part, the cranked bracket and a cover part mounted to the bracket; resulting in three distinct parts.

In the traditional strap bracket where the bracket is flush to the ceiling and it is possible to use just two parts the problem persists where the cables extending through the aperture in the ceiling must be bent round the longitudinal edges of the bracket causing stress on the ceiling structure or misalignment of the light fitting relative to the aperture or other fittings.

There is a modern trend towards replacing traditional ceiling rose type lights with more stylised light fittings. Therefore, there is a requirement for a simplified way of attaching these light fittings to the ceiling using pre-existing holes.

It is an object of the present invention to mitigate the problems associated with the conventional strap bracket in relation to light fittings and fixtures by providing a more efficient light fitting bracket which is less cumbersome and time consuming to install than that of the conventional light fitting brackets on the market.

Accordingly, the present invention provides a bracket for attaching a light fitting to a ceiling or wall, characterised in that it comprises a main body to be directly applied to the ceiling or wall and to be flush with the ceiling or wall, the main body comprising:

a central portion with a central aperture for the passage of the electrical cable coming out from the ceiling or wall, the central aperture being sized so that the electrical cable can pass through the central aperture;

at least two arm portions that extend from the central portion and comprise elongated channels for receiving the fasteners for fastening the bracket to the ceiling or wall.

Preferably, the latitudinal dimension of the central portion is equal to or greater than the latitudinal dimension of the arm portions.

Ideally, the latitudinal dimension of the central aperture is equal to or greater than the latitudinal dimension of the arm portions.

Preferably, the diameter of the central portion is equal to or greater than the latitudinal dimension of the arm portions.

Ideally, the diameter of the central aperture is equal to or greater than the latitudinal dimension of the arm portions.

Preferably, the at least two arm portions extend outwardly from the central portion.

Ideally, the at least two arm portions extend radially outwardly from the central portion.

Advantageously, having a light fitting bracket comprising a central portion with a central aperture enables an installer to simply slip the bracket over the electrical cable so that prior art problems between the cable and the bracket are redundant when attaching the bracket directly to the ceiling and/or wall. This allows the installer to freely use both hands when fastening the bracket to the ceiling. Further, the main body of the bracket is flush to the ceiling and will not be positioned "off-centre" as the issues regarding the cable acting upon the conventional strap bracket are no longer present.

Further advantageously, the use of elongate channels for receiving the fasteners for fastening the bracket obviates the issue of non-alignable fastening apertures which are present in the conventional light fitting brackets. In the present invention, the elongate channels enable the operator to attach the bracket via the first elongate channel and then slide the bracket to ensure that the second channel aligns to the second fastener aperture within the ceiling. This ensures that an installer can always align and utilise at least two fasteners to attach the bracket to the ceiling without the requirement to drill a further aperture into the ceiling plasterboard. This significantly reduces the complexity of replacing one light fitting with another. It also results in that only two parts are required namely, the bracket and the light fitting housing to secure the light fitting to the ceiling.

Further, having a device whereby the latitudinal dimension of the central aperture is greater than the latitudinal dimension of the arm portions bestows upon the present invention added strength beyond that of the prior art. In addition, this avoids any potential rough edges of the pre-existing ceiling aperture preventing the bracket from sitting flush to the ceiling as the central aperture could skirt around the entire aperture in the ceiling. This enables an installer to install the bracket flusher to the ceiling than that of the conventional strap bar which can contact or abut with these ceiling aperture rough edges.

Preferably, the central portion has a continuous perimeter defining an enclosed central aperture.

Advantageously, the central portion having a continuous perimeter provides added structural strength and rigidity to the bracket beyond that found within conventional light fitting brackets where only a partially enclosed central aperture are defined.

Alternatively, the central portion has a discontinuous perimeter defining a partially enclosed central aperture.

Preferably, the electrical cable comprises a plurality of electric cables.

Ideally, the electrical cable comprises an outer sheath to surround at least a portion of the plurality of electric cables.

Ideally, the electric cables include the conventional live wire and/or neutral wire and/or earth wire.

Preferably, the electric cables include four live wires, four earth wires, four neutral wires and a feed wire.

It will be appreciated that the electrical cable is intended to comprise the electric cables which are required for the normal functioning of the light fitting in both a domestic and commercial setting for example the electrical cable is a domestic/commercial electrical cable.

Ideally, the bracket is configured so that the diameter of the electrical cable is less than the diameter of the central aperture.

Preferably, the bracket is configured so that the diameter of the plurality of electric cables is less than the diameter of the central aperture.

Preferably, the arm portions which extend from opposite sides of the central portion are aligned.

Ideally, the arm portions extend outwardly defining between them an angle less than 180°.

Preferably, the arm portions extend outwardly defining between them an angle equal to 180°.

Advantageously, having aligned arm portions extending from opposite sides of the central portion enables the device to be universally used in replacement of the conventional strap bracket as pre-existing fastener apertures within the ceiling can be utilised rather than the device requiring the re-drilling of these for attachment.

Ideally, the central portion with the central aperture and the at least two arm portions with elongated channels lie on the same plane intended to be flush with the ceiling or wall.

Advantageously, this enables the installation of the light fitting to be flush and central relative to the electrical cable aperture within the ceiling. This alleviates issues of off-centredness which are associated with the prior art.

Ideally, the central aperture is defined as a closed aperture by the central portion.

Advantageously, this central portion defining the closed aperture provides added structural strength and rigidity beyond that found within convention light fitting brackets without the requirement for additional structural features.

Preferably, the central aperture is defined in a circular configuration by the central portion.

Ideally, the central aperture is defined in a polygonal configuration by the central portion.

Preferably, the central portion defines the circumference of the central aperture.

Ideally, the central portion has a continuous perimeter defining the circumference of the central aperture.

Preferably, the central portion has a discontinuous perimeter defining the partial circumference of the partially enclosed central aperture.

Preferably, the central aperture is oversized in respect of the size of the electrical cable intended to pass through it, thus avoiding any contact between the inner edge of the central portion delimiting the central aperture and the electrical cable.

Advantageously, as the central aperture of the present invention is oversized in respect to the size of the electric cable, this alleviates any health and safety concerns of an electrical cable making contact with a metallic component. These health and safety concerns are inherent to the conventional strap bracket as the cable is bent around the strap bar.

Ideally, the central aperture is sized so as to be larger than the hole that is defined in the ceiling or wall and from which the electrical cable comes out.

Advantageously, having the central aperture of the device larger than the ceiling aperture not only obviates the health and safety concerns of the cable making contact with a metallic component but it also enables the device to remain flush to the ceiling irrespective of any potential ribs or uneven ceiling surface close to the ceiling aperture circumference due to its construction or damage over time.

Ideally, the bracket has a central portion defining a central aperture having a diameter in the range of 10 mm to 35 mm.

Preferably, the bracket has a central portion defining a central aperture having a diameter in the range of 15 mm to 30 mm.

Ideally, the bracket has a central portion defining a central aperture having a diameter in the range of 20 mm to 25 mm.

Preferably, the central aperture is circular and the diameter of the central aperture is greater than or equal to the width of the arm portions.

Ideally, the elongated receiving channels extend along the majority of the longitudinal length of the corresponding arm portions.

Advantageously, having the elongated receiving channels extending for the majority of the longitudinal length of the corresponding arm portions enables the universal application of the bracket to attach a light fitting to either the wall or ceiling within the dimensions of the elongated receiving channels. The extent of the elongated receiving channels along substantially all of the length of the arm portions provides the bracket with the maximum adjustment to enable the replacement of one light fitting with another.

Preferably, the elongated receiving channels extend from the central aperture until the corresponding free end of the arm portions.

Ideally, the elongated receiving channels are connected with and opened into the central aperture.

Preferably, the elongated receiving channels are separated from the central aperture.

Ideally, the elongated receiving channels are separated from the central aperture by a portion of the central portion of the bracket.

Preferably, the elongated receiving channels are separated from the central aperture by a portion of the arm portion of the bracket.

In an alternative embodiment, the bracket comprises four arm portions.

Ideally in the alternative the four arm portions are in a cruciform arrangement.

Advantageously, the cruciform arrangement in this alternative embodiment empowers the device with a greater structural support enabling it to attach to the ceiling at four attachment locations. Furthermore, the cruciform arrangement allows for the attachment of a heavier light fitting. The use of four attachment locations allows the bracket to remain in flush engagement with the ceiling even when a heavier light fitting is suspended therefrom.

In a further alternative embodiment, the bracket comprises three arm portions.

Ideally, the bracket comprises means for detachably coupling the cover of the light fitting to the bracket.

Preferably, the bracket further comprises, at the ends of the arm portions, lip portions for coupling the cover of the light fitting to the bracket.

Ideally, the lip portions are bent out of the main plane in respect of the flat portions of the bracket in the same direction.

Ideally, coupling means are provided between the light fitting and the bracket.

Preferably, the coupling means comprises snap fit, press fit, click fit or other quick fit and release engagement means.

Ideally, the coupling means comprise screws, bolts, pins or other means for engaging corresponding seats or apertures defined in the lip portions.

Preferably, the lip portions of the bracket are flat for coupling a box shaped cover of the light fitting.

Alternatively, the lip portions of the bracket are curved for coupling a round cover of the light fitting.

Ideally, the bracket is a lintel type mounting bracket.

Preferably, the lintel type mounting bracket has a sufficient width and thickness to support the weight of the respective hanging light fixture.

Advantageously, the lintel type mounting bracket provides a rigidity to the light fitting.

Ideally, the bracket has a longitudinal length sufficient to attach to conventional light fittings.

Preferably, the bracket has a longitudinal length in the range of 60 mm to 240 mm Ideally, the bracket has a longitudinal length in the range of 80 mm to 220 mm.

Preferably, the bracket is a standalone component for attaching directly the light fitting to the ceiling or wall.

Ideally, the bracket is a single component bracket.

Preferably, the bracket is a light fitting bracket.

Preferably, the bracket has a material thickness in the range of 0.5 mm to 2.5 mm.

Ideally, the bracket has a material thickness in the range of 1 mm to 2 mm.

Preferably, the bracket has a material thickness of 1.5 mm.

Accordingly, the present invention provides a bracket arrangement as outlined above, wherein a first bracket and a second bracket are mounted one on top of the other with their central portion overlapping and aligned the brackets being rotated relative to one another so that the arm portions are not overlapping and out of alignment.

Accordingly, the present invention is a light fitting for a ceiling or wall, characterised in that it comprises a bracket for attaching a light fitting to a ceiling or wall, the bracket comprises a main body to be directly applied to the ceiling or wall and to be flush with the ceiling or wall, the main body comprising: a central portion with a central aperture for the passage of the electrical cable coming out from the ceiling or wall, the central aperture being sized so that the electrical cable can pass through the central aperture; at least two arm portions that extend from the central portion and comprise elongated channels for receiving the fasteners for fastening the bracket to the ceiling or wall.

Accordingly, the present invention is a light fitting assembly having a bracket as outlined above.

Accordingly, the present invention is a light fitting assembly characterised in that it comprises:
  a device as described herewith intended to be fastened to the ceiling or wall,
  a light fitting with a lamp that is intended to be connected to the electrical cable that comes out from the ceiling or wall and that passes through the central aperture of the bracket,
  a cover that is detachably coupled to the bracket.

Accordingly, the present invention is a method for attaching a light fitting to the ceiling or wall, even in case of pre-existing holes for fasteners defined in the ceiling or wall, characterized in that the light fitting is fixed to the ceiling or wall by means of a bracket as described herewith.

Preferably, the light fitting is attached to the ceiling or wall only and directly by means of the bracket.

Ideally, the method comprises the following steps:
  passing the electrical cable coming out from the ceiling or wall through the central aperture of the bracket,
  aligning the elongated channels of the bracket with the holes for fasteners defined in the ceiling or wall,
  applying the fasteners into the holes for fastening the bracket to the ceiling or wall.

The skilled man will appreciate that all preferred or optional features of the invention described with reference to only some aspects or embodiments of the invention may be applied to all aspects of the invention.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The invention will now be described with reference to the accompanying drawing which shows by way of example only one embodiment of an apparatus in accordance with the invention.

Figure 1:
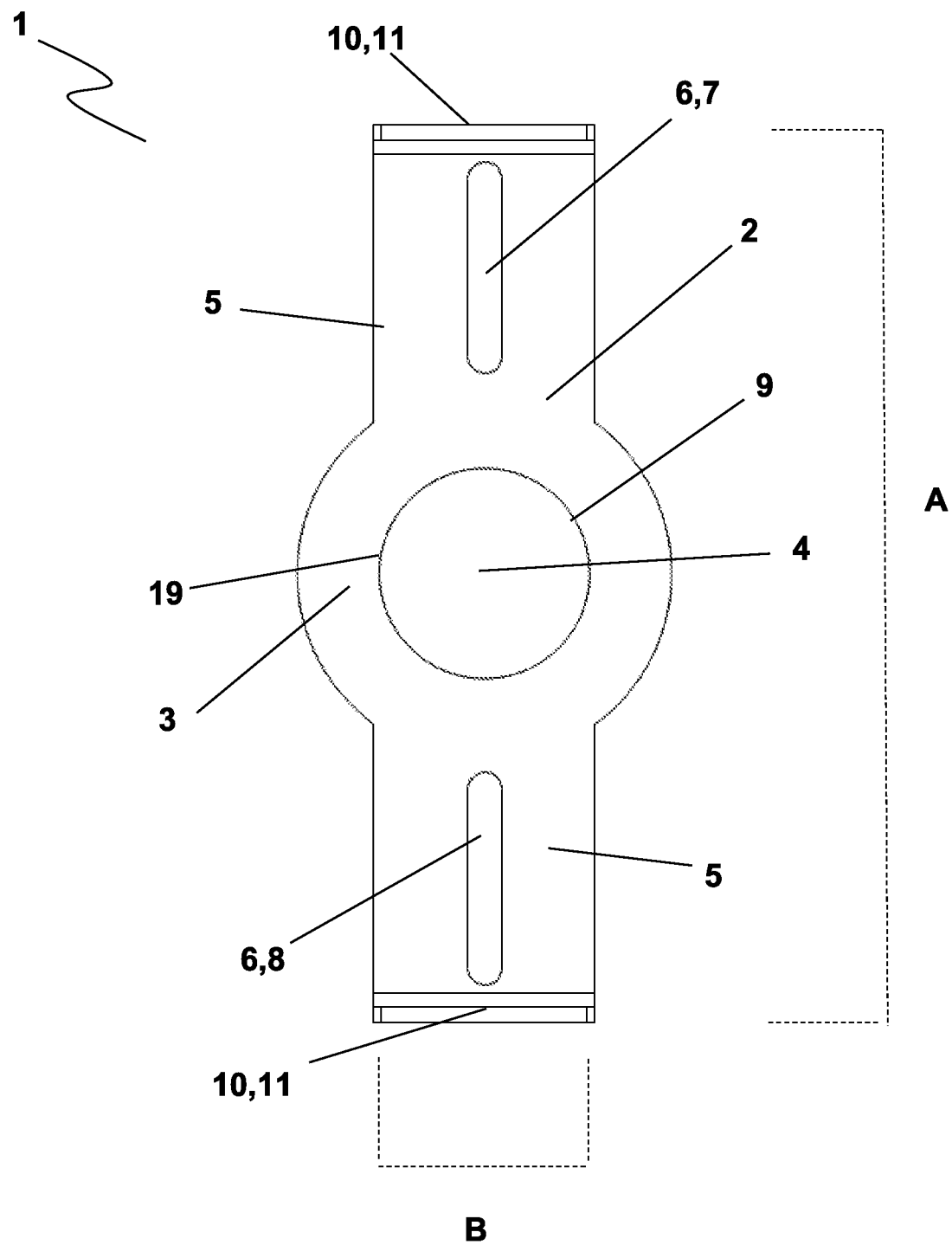
FIG. 1 is a top view of the first embodiment of the present invention.
Figure 2:
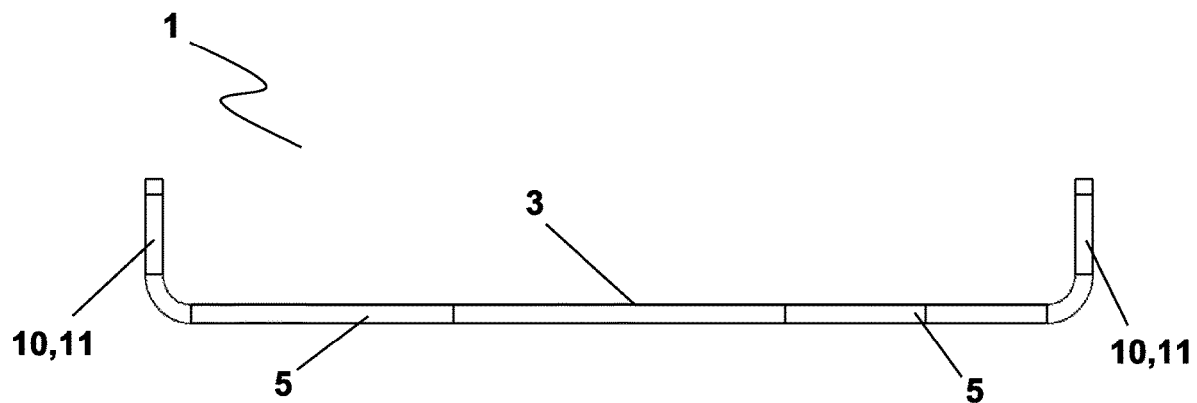
FIG. 2 is a side view of the present invention along A of FIG. 1
Figure 3:
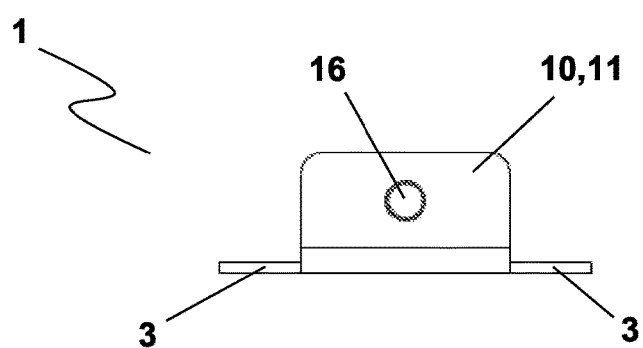
FIG. 3 is a side view of the present invention along B of FIG. 1
Figure 6:
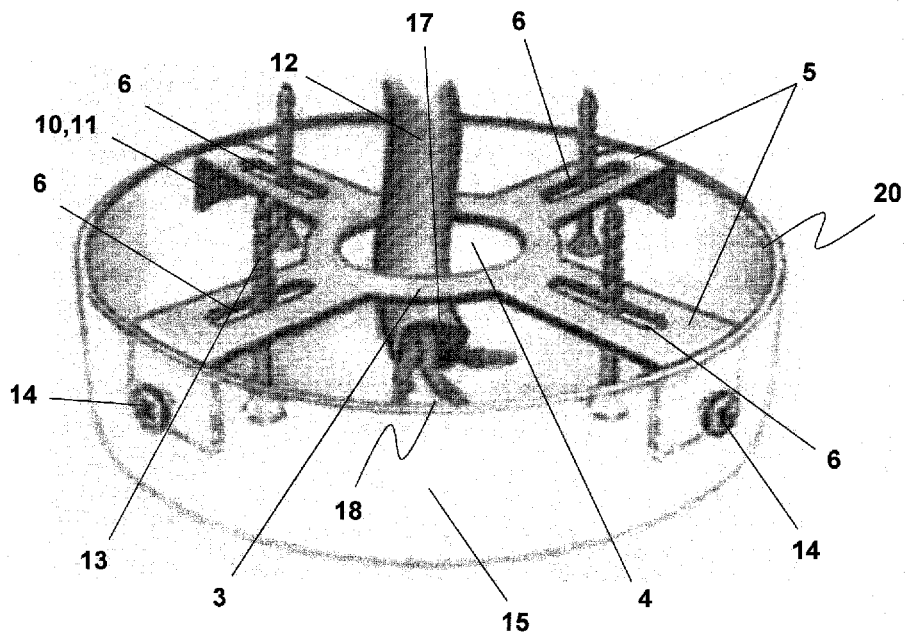
FIG. 6 is a perspective view of the second embodiment in-use.

In the drawings and with particular reference to FIGS. 1 to 3, there is shown a bracket indicated generally by the reference numeral 1 for attaching a light fitting (not shown) to a ceiling or wall (not shown). The bracket 1 has a main body 2 to be directly applied to the ceiling or wall (not shown) and to be flush with the ceiling or wall (not shown). The main body 2 has a central portion 3 with a central aperture 4 for the passage of the electrical cable 12 coming out from the ceiling or wall (not shown). The central aperture 4 being sized so that the electrical cable 12 can easily pass through it. As can be seen in FIG. 6 by way of example electrical cable 12 comprises an outer sheath 17 surrounding a plurality of electric cables including the traditional live, neutral and/or earth cable generally indicated by numeral 18. It will be appreciated that the electrical cable is not limited to merely the noted traditional cables and is intended to comprise the electric cables 18 which are required for the normal functioning of the light fitting in both a domestic and commercial setting. The main body 2 further has two arm portions 5 that extend outwardly from the central portion 3. The arm portions having elongated channels 6 for receiving the fasteners 13 such as nails, screws, plasterboard pins etc. for fastening the bracket 2 to the ceiling or wall (not shown) whereby the latitudinal dimension of the central aperture 4 is equal to or greater than the latitudinal dimension of the arm portions 5.

Figure 7:
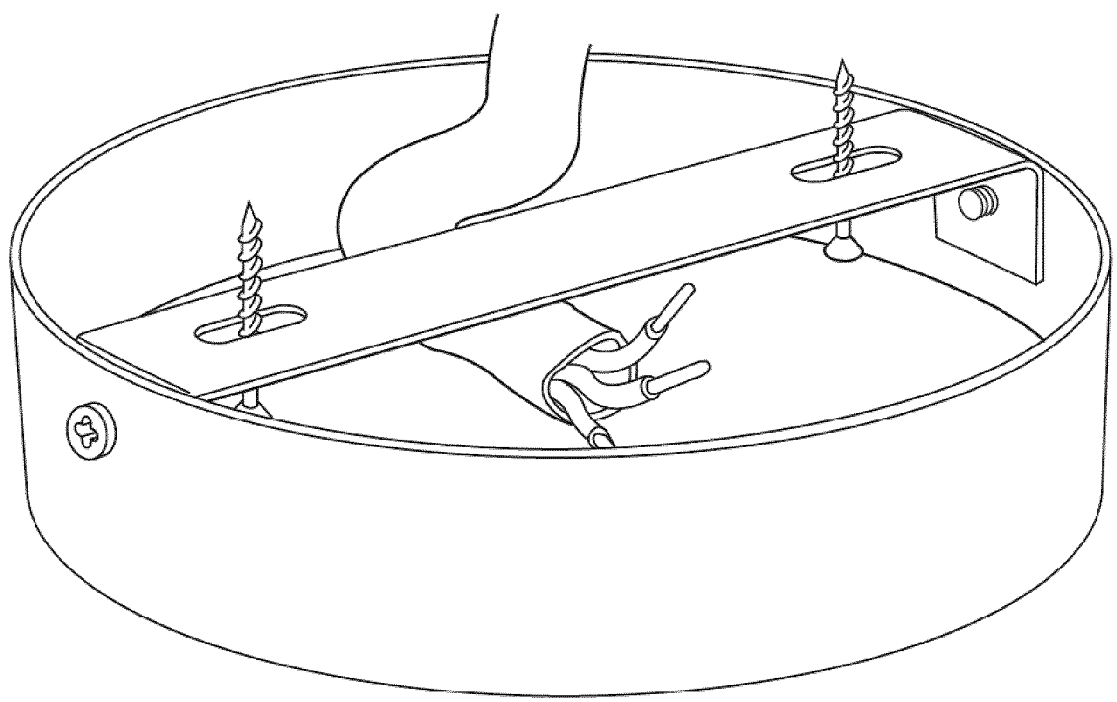
FIG. 7 is a perspective view of the prior art strap bar in use.

A light fitting bracket 1 which has a central portion 3 having a central aperture 4 enables an installer to simply slip the bracket 1 over the electrical cable 12 so that the prior art problems between the cable 12 and the bracket 1 (see FIG. 7) are redundant when attaching the bracket 1 directly to the ceiling and/or wall (not shown). This allows the installer to freely use both hands when fastening the bracket 1 to the ceiling (not shown). It further provides that the main body of the bracket 2 is flush to the ceiling and will not be positioned "off-centre" as the issues regarding the cable acting upon the conventional strap bracket (as shown in FIG. 7) are no longer present. Further, the use of elongate channels 6 for receiving the fasteners to fasten the light fitting bracket 2 obviates the issue of non-alignable fastening apertures which are present in the conventional light fitting brackets. The elongate channels 6 enable the operator to attach the bracket 1 via the first elongate channel 7 and then slide the bracket 2 to ensure that the second channel 8 aligns to the second fastener aperture within the ceiling (not shown). This ensures that an installer can always align and utilise at least two fasteners to attach the bracket 1 to the ceiling (not shown) without the requirement to drill a further aperture into the ceiling plasterboard (not shown). This significantly reduces the complexity of replacing one light fitting with another. It also results in that only two parts are required namely, the bracket 1 and the light fitting housing 15 to secure the light fitting to the ceiling or wall (not shown).

Further, having a bracket 1 whereby the latitudinal dimension of the central aperture 4 is greater than the latitudinal dimension of the arm portions 5 bestows added structural support to the bracket 1 beyond that of the prior art. In addition, this avoids any potential rough edges (not shown) of the pre-existing ceiling aperture (not shown) preventing the bracket 1 from sitting lush to the ceiling or wall as the central aperture 4 could skirt around the entire aperture in the ceiling. This enables an installer to install the bracket flusher to the ceiling than that of the conventional strap bar which can contact or abut with these ceiling aperture rough edges (not shown).

The central portion 3 has a continuous perimeter 19 defining the enclosed central aperture 4. This continuous perimeter 19 provides added structural strength and rigidity to the bracket 1 beyond that found with conventional light fitting brackets (not shown) where only a partially enclosed central aperture is defined. The bracket 1 is configured so that the dimeter of the electrical cable 12 is less than the diameter of the central aperture 4.

The arm portions 5 which extend from opposite sides of the central portion 3 are aligned with one another. This enables the bracket 1 to be universally used in replacement of the conventional strap bracket (FIG. 7) as pre-existing fastener apertures within the ceiling (not shown) can be utilised rather than the bracket 1 requiring the re-drilling of these fastener apertures for attachment. The central portion 3 with the central aperture 4 and the two arm portions 5 with elongated channels 6 lie on the same plane to be flush with the ceiling or wall (not shown). This enables the installation of the light fitting to be flush and central relative to the electrical cable aperture within the ceiling (not shown). This alleviates issues of off-centredness which are associated with the prior art.

The central aperture 4 is defined as a closed aperture 4 by the central portion 3. This central portion 3 defining the closed aperture 4 provides added strength and rigidity beyond that found within conventional light fitting brackets without the requirement for addition structural features. The central aperture 4 as defined is circular (as shown in FIGS. 1-6) and oversized in respect of the size of the electrical cable 12 intended to pass through it. This avoids any contact between the inner edge 9 of the central 3 delimiting the central aperture 4 and the electrical cable 12. As the central aperture 4 is oversized in respect to the size of the electric cable 12, this alleviates any health and safety concerns of an electrical cable making contact with a metallic component. These health and safety concerns are inherent to the conventional strap bracket as the cable is bent around the strap bar (see FIG. 7). Further the central aperture 4 can be also oversized relative to the ceiling aperture (not shown) this enables the bracket 1 to remain flush to the ceiling (not shown) irrespective of any potential ribs or uneven ceiling surface close to the ceiling aperture perimeter (not shown) due to its construction or damage over time.

The elongated receiving channels 6 extend along the majority of the longitudinal length of the corresponding arm portions 5. This enables the universal application of the bracket 1 to attach a light fitting to either the wall or ceiling (not shown) within the dimensions of the elongated receiving channels 6. The extent of the elongated receiving channels 6 along substantially all of the length of the arm portions 5 provides the bracket 1 with the maximum adjustment to enable the replacement of one light fitting with another.

Figure 4:
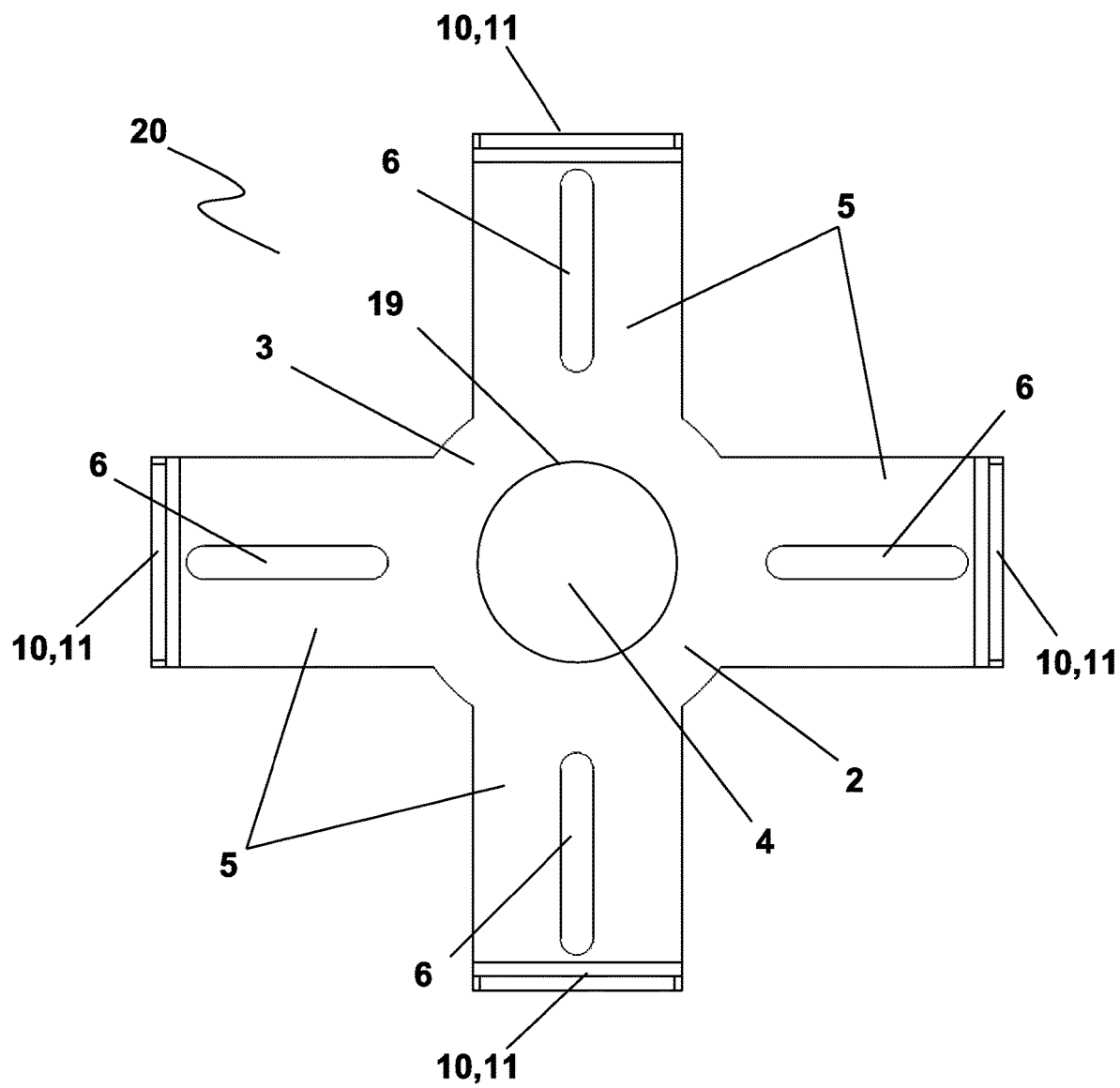
FIG. 4 is a top view of the second embodiment of the present invention.
Figure 5:
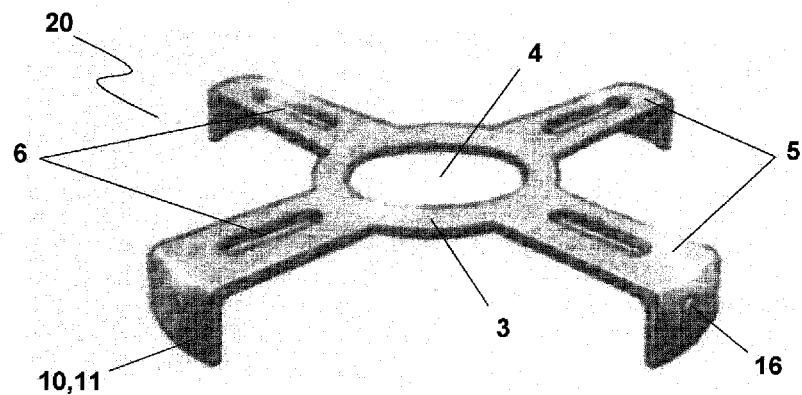
FIG. 5 is a perspective view of the second embodiment.

As seen within FIGS. 4 to 6, the bracket 2 in its second embodiment generally indicated by reference numeral 20 comprises four lateral portions 5 in a cruciform arrangement. The cruciform arrangement in this alternative embodiment empowers the device 1 with a greater strength enabling it to attach to the ceiling or wall (not shown) at four attachment locations. Furthermore, the cruciform arrangement allows for the attachement of a heavier light fitting. The use of four attachment locations allows the bracket 20 to remainin flush engagement with the ceiling or wall (not shown) even when a heavier light fitting is suspended therefrom.

As can be seen within all the figures and in particular reference FIG. 3 the bracket 1 has a mechanism 10 for detachably coupling the cover of the light fitting (not shown) to the bracket 1. To this end lip portions 11 are located at the ends of the arm portions 5. The lip portions 11 are bent out of the main plane in respect of the flat portions of the bracket 1 and can be either flat of curved depending on the shape of the light fitting base. The coupling members 14 to detachably couple the bracket 1 to the light fitting can comprise of snap fit, press fit, click fit or other quick fit and release engagement mechanism. Alternatively, as shown in FIG. 6 these coupling members 14 may be screws or the like.

FIG. 6 shows the second embodiment of the present invention in the in-use position. As can be seen in FIG. 6 the electric cable 12 passes through the central aperture 4 of the bracket 1. Fasteners 13 pass through the elongated channels 6 of the arm portions 5. Once the bracket 1 is attached to the ceiling or wall (not shown) the base of a light fitting 15 is raised towards the device 1. The light fitting base 15 is coupled to the lip portions 11 of the bracket 1 by coupling members 14 engaging with the lip portion seats/apertures 16.

In relation to the detailed description of the different embodiments of the invention, it will be understood that one or more technical features of one embodiment can be used in combination with one or more technical features of any other embodiment where the transferred use of the one or more technical features would be immediately apparent to a person of ordinary skill in the art to carry out a similar function in a similar way on the other embodiment.

In the preceding discussion of the invention, unless stated to the contrary, the disclosure of alternative values for the upper or lower limit of the permitted range of a parameter, coupled with an indication that one of the values is more highly preferred than the other, is to be construed as an implied statement that each intermediate value of the parameter, lying between the more preferred and the less preferred of the alternatives, is itself preferred to the less preferred value and also to each value lying between the less preferred value and the intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof.

The invention claimed is:

1. A bracket for attaching a light fitting to a ceiling or wall, the bracket comprising:
    a main body to be directly applied to the ceiling or wall and to be flush with the ceiling or wall;
    wherein the main body comprises:
        a central portion with a central aperture for the passage of an electrical cable coming out from the ceiling or wall, the central aperture being sized so that the electrical cable can pass through the central aperture; and
        at least two arm portions that extend from the central portion and comprise elongated channels for receiving fasteners for fastening the bracket to the ceiling or wall and a latitudinal dimension of the central aperture is equal to or greater than a latitudinal dimension of the at least two arm portions.

2. The bracket as claimed in claim 1, wherein the at least two arm portions extend outwardly from the central portion.

3. The bracket as claimed in claim 1 wherein the central portion has a continuous perimeter defining an enclosed central aperture.

4. The bracket as claimed in claim 1, wherein the central portion has a discontinuous perimeter defining a partially enclosed central aperture.

5. The bracket as claimed in claim 1, wherein the bracket is configured so that a diameter of the electrical cable is less than a diameter of the central aperture.

6. The bracket as claimed in claim 1, wherein the arm portions which extend from opposite sides of the central portion are aligned.

7. The bracket as claimed in claim 1, wherein the arm portions extend outwardly defining between them an angle less than 180°.

8. The bracket as claimed in claim 1, wherein the arm portions extend outwardly defining between them an angle equal to 180°.

9. The bracket as claimed in claim 1, wherein the central portion with the central aperture and the at least two arm portions with elongated channels lie on the same plane intended to be flush with the ceiling or wall.

10. The bracket as claimed in claim 1, wherein the central aperture is defined as a closed aperture by the central portion.

11. The bracket as claimed in claim 1, wherein the central aperture is defined in a circular configuration by the central portion.

12. The bracket as claimed in claim 11, wherein the central portion defines the circumference of the central aperture.

13. The bracket as claimed in claim 12, wherein the central portion has a continuous perimeter defining the circumference of the central aperture.

14. The bracket as claimed in claim 12, wherein the central portion has a discontinuous perimeter defining the partial circumference of the partially enclosed central aperture.

15. The bracket as claimed in claim 1, wherein the central aperture is oversized in respect of the size of the electrical cable intended to pass through it, thus avoiding any contact between an inner edge of the central portion delimiting the central aperture and the electrical cable.

16. The bracket as claimed in claim 1, wherein the central aperture is circular and a diameter of the central aperture is greater than or equal to the width of the arm portions.

17. The bracket as claimed in claim 1, wherein the elongated receiving channels extend along a majority of a longitudinal length of the corresponding arm portions.

18. The bracket as claimed in claim 1, wherein the elongated receiving channels extend from the central aperture until a corresponding free end of the arm portions.

19. The bracket as claimed in claim 1, wherein the elongated receiving channels are connected with and opened into the central aperture.

20. The bracket as claimed in claim 1, wherein the bracket comprises four arm portions.

21. The bracket as claimed in claim 20, wherein the four arm portions are in a cruciform arrangement.

22. The bracket as claimed in claim 1, wherein the bracket further comprises, at the ends of the arm portions, lip portions for coupling a cover of the light fitting to the bracket.

23. The bracket as claimed in claim 1, wherein the bracket is a single component bracket.

24. A light fitting for a ceiling or wall, comprising:
   a bracket for attaching a light fitting to a ceiling or wall;
   wherein the bracket comprises:
      a main body to be directly applied to the ceiling or wall and to be flush with the ceiling or wall;
   wherein the main body comprises:
      a central portion with a central aperture for the passage of an electrical cable coming out from the ceiling or wall, the central aperture being sized so that the electrical cable can pass through the central aperture; and
      at least two arm portions that extend from the central portion and comprise elongated channels for receiving fasteners for fastening the bracket to the ceiling or wall and a latitudinal dimension of the central aperture is equal to or greater than a latitudinal dimension of the at least two arm portions.

* * * * *